Dec. 24, 1963 P. A. BRAGINETZ 3,114,974
ELLIPSE COMPASS
Filed June 15, 1962 3 Sheets-Sheet 1

INVENTOR.
PAUL A. BRAGINETZ
BY
Otto Moeller
Attorney

Dec. 24, 1963    P. A. BRAGINETZ    3,114,974
ELLIPSE COMPASS
Filed June 15, 1962    3 Sheets-Sheet 2
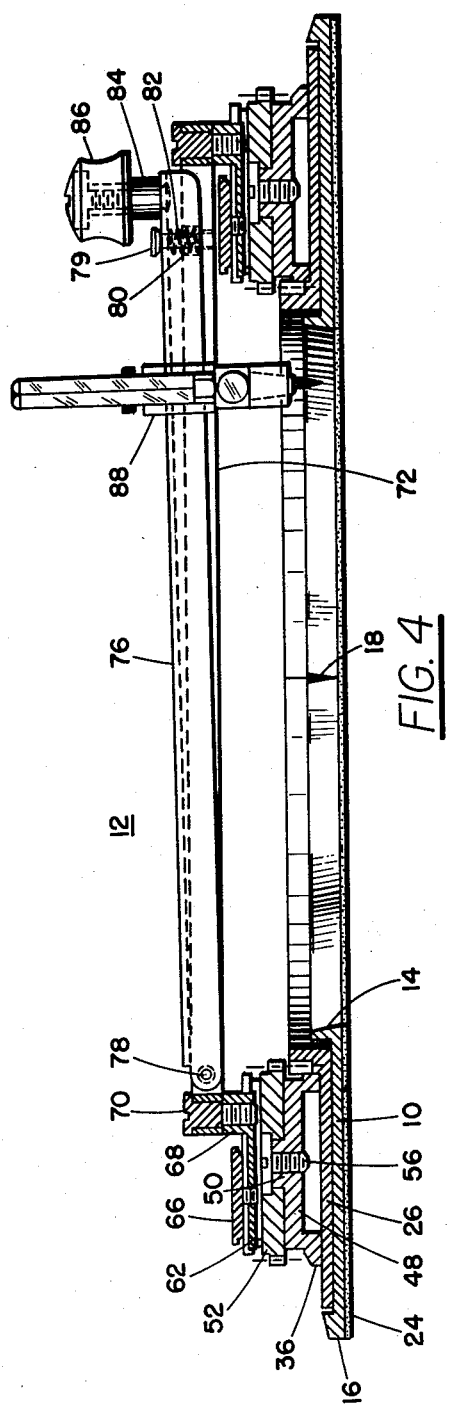
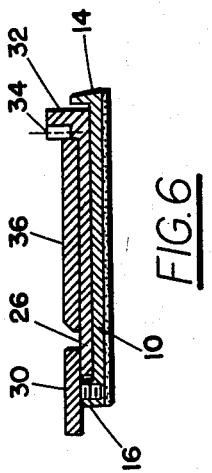
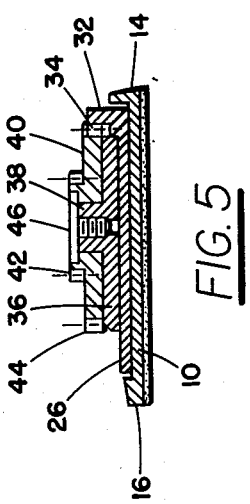
INVENTOR.
PAUL A. BRAGINETZ
BY
Otto Moeller
Attorney Dec. 24, 1963 P. A. BRAGINETZ 3,114,974
ELLIPSE COMPASS
Filed June 15, 1962 3 Sheets-Sheet 3

INVENTOR.
PAUL A. BRAGINETZ
BY
Otto Moeller
Attorney

United States Patent Office 3,114,974
Patented Dec. 24, 1963

3,114,974
ELLIPSE COMPASS
Paul A. Braginetz, 1609 Armstrong Ave., Staunton, Va., assignor of one-fifth to Arthur Berman, Harrisburg, Pa.
Filed June 15, 1962, Ser. No. 202,828
12 Claims. (Cl. 33—30)

The present invention relates to new and useful improvements in ellipse generating apparatus.

An object of the invention is to provide an ellipse generating apparatus that can be manipulated with facility and ease and that may be readily and conveniently adjusted and set to trace any reasonably sized ellipse at any desired angle of projection.

Another object is to provide ellipse generating apparatus for tracing ellipses having any desired ratio of major and minor axes between a circle and a straight line and to place such ellipse or ellipses at any place on a surface with precision and facility.

Another object is to provide ellipse generating apparatus that is stable when being operated, thereby minimizing relative movement of the apparatus with respect to the surface on which the ellipse is being traced, to insure accurate location and disposition of the ellipse with reference to preselected coordinates.

Still another object is to provide ellipse generating apparatus that is compact, relatively simple in construction and that may be easily and cheaply manufactured.

Other objects and advantages of the invention reside in certain novel features of the construction, arrangement and combination of parts which will be hereinafter more fully described, reference being had to the accompanying drawings forming a part of this specification, and in which drawings:

FIGURE 4 is a sectional view taken on line A—A of FIGURE 1;

FIGURE 5 is a sectional view taken on line B—B of FIGURE 1;

FIGURE 6 is a sectional view taken in line C—C of FIGURE 1;

Figure 1:
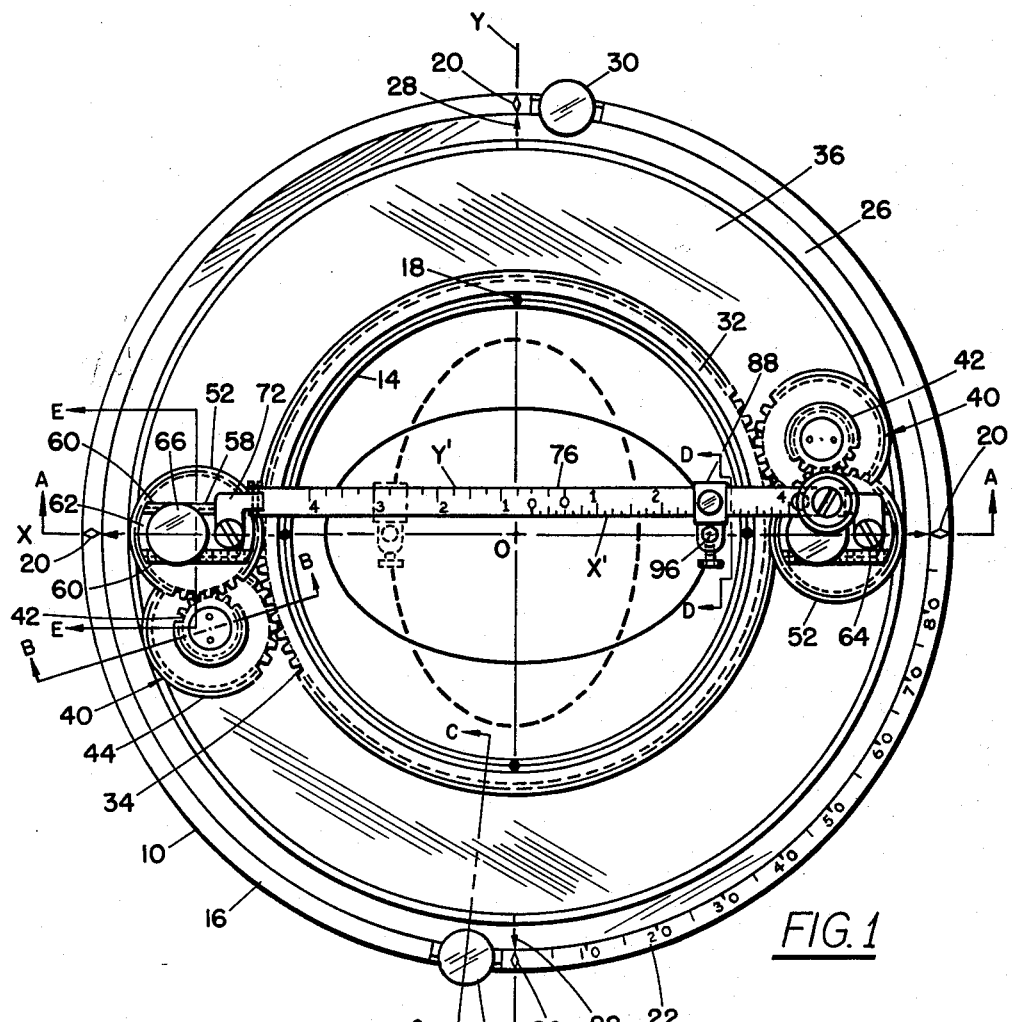
FIGURE 1 is a plan view of an embodiment of the novel ellipsograph.

The apparatus includes an annular flat plate-like member constituting and hereinafter referred to as an annular planetary protractor base ring 10, which may be formed of metal, plastic or any other suitable stiff material. The protractor base ring 10 forms a guide support for the ellipsograph proper, which is indicated as a whole by the reference numeral 12. The protractor base ring 10 is not essential to the functioning of the ellipsograph 12, but has a cooperative relation therewith, as hereinafter described, to provide greater flexibility in the use and operation of the ellipsograph proper. The annular protractor base ring 10 is provided at its inner peripheral extremity with an upwardly projecting annular flange 14, the inner side wall of which is preferably slightly downwardly convergent, as best shown in FIGURES 4 and 5; and is provided at its outer peripheral extremity with an upwardly projecting annular shoulder 16, the top surface of which preferably slopes slightly downward in its outward extent, also as best shown in FIGURES 4 and 5.

The inner slightly downwardly convergent side wall of the annular flange 14 is provided with 90° spaced reference indicia 18 and the sloping top surface of the annular shoulder 16 is provided with 90° spaced reference indicia 20 in radial alinement with the indicia 18, whereby the protractor base ring 10 may be visually located with one set of diametrically opposite indicia on an X axis and the other set of diametrically opposite indicia on a Y axis, hereinafter referred to as a primary pair of axes.

As shown in FIGURE 1, one quadrant of the protractor base ring 10 between two of the indicia 20 is provided on the top surface of the annular shoulder 16 with a scale 22 marked in degrees from 0° to 90° whereby, as and for the purpose hereinafter described, the ellipsograph proper 12 may be rotated with respect to the protractor base ring 10 to any one of a number of secondary pairs of X, Y axes, while still remaining oriented with respect to the origin of the primary X, Y axes.

The under side of the planetary protractor base ring 10 is preferably provided with a liner 24 of a material having a high coefficient of friction, such as neoprene, to prevent it from skidding on the working surface when manual force is applied to the hereinafter described movable ellipse generating component of the ellipsograph proper 12.

Referring now to the ellipsograph proper 12, which may be employed with or without the planetary base ring 10 in generating ellipses as above noted and as will be explained hereinafter in detail, it includes an annular flat plate-like member constituting and hereinafter referred to as an annular ellipsograph base 26, formed of metal, plastic or any other suitable stiff material. The annular ellipsograph base 26 rests in surface engagement on the annular protractor base ring 10 between the annular flange 14 and the annular shoulder 16, with the inner peripheral edge of the ellipsograph base 26 closely adjacent the annular flange 14 to maintain the ellipsograph base 26 in coaxial position with respect to the protractor base ring 10, while permitting relative rotation therebetween. This same relation may, of course, be accomplished by also or alternatively having the outer peripheral edge of the ellipsograph base 26 disposed closely adjacent the annular shoulder 16 of the protractor base ring 10.

Figure 9:
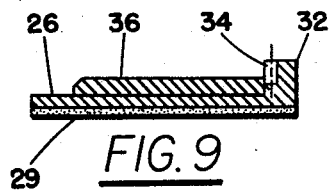
FIGURE 9 is a sectional view taken on line C—C of FIGURE 1 with the protractor base removed and a non-skid liner shown on the base of the ellipsograph proper.

The top face of the annular ellipsograph base 26 adjacent its outer peripheral edge is provided with 90° spaced reference indicia 28, whereby when the ellipsograph proper 12 is used without the planetary protractor base ring 10, it may be visually located with one pair of diametrically opposite indicia 28 on an X axis and the other pair of diametrically opposite indicia on a Y axis. When the ellipsograph proper 12 is used without the planetary protractor base ring 10, the under side of the ellipsograph base 26 is preferably provided with a liner 29, as shown in FIGURE 9, of a material having a high coefficient of friction, such as neoprene, to prevent it from skidding on the working surface when manual force is applied to the hereinafter described movable ellipse generating component of the ellipsograph 12.

When the ellipsograph 12, is employed in conjunction with the planetary protractor base 10, and with the latter disposed with its indicia 20, coinciding with a primary pair of X, Y axes, as above described, the ellipsograph base 26, may be rotated to aline its indicia 28, with any desired angle marking on the scale 22, to scribe an ellipse on a secondary pair of X, Y axes at a desired angle with respect to the primary pair of X, Y axes, while still remaining oriented with respect to the origin of the primary X, Y axes. In order to secure the ellipsograph base 26, in any desired adjusted position while scribing the desired ellipse, one or more locking screws 30, are threaded in the annular shoulder 16 of the planetary protractor base ring 10, with the head of the locking screw 30, overlapping a peripheral portion of the ellipsograph base 26, as best shown in FIGURES 1 and 6. Thus by threading the locking screw down or up, the ellipsograph base 26, may be securely clamped to the planetary protractor base ring 10, or released therefrom to permit rotation thereof to any desired adjusted position.

The ellipsograph base 26, is provided at its inner peripheral extremity with an upwardly projecting annular flange 32. The upper portion of the outside peripheral surface of the flange 32, is provided with teeth forming an external ring gear 34. While the ring gear 34, is preferably formed as an integral part of the flange 32, of the ellipsograph base 26, it may be formed as a separate part secured in suitable manner to the flange 32.

An annular flat plate-like slide ring 36, rests on the surface of the ellipsograph base 26, and is arranged for slidable rotation thereon about axis concentric with the axis of the ellipsograph base 26. For this purpose, the inner peripheral wall of the slide ring 36, closely fits the outer peripheral wall of the portion of the annular flange 32, of the ellipsograph base 26, below the ring gear 34, forming in effect a bearing for the rotating slide ring 36.

Figure 7:
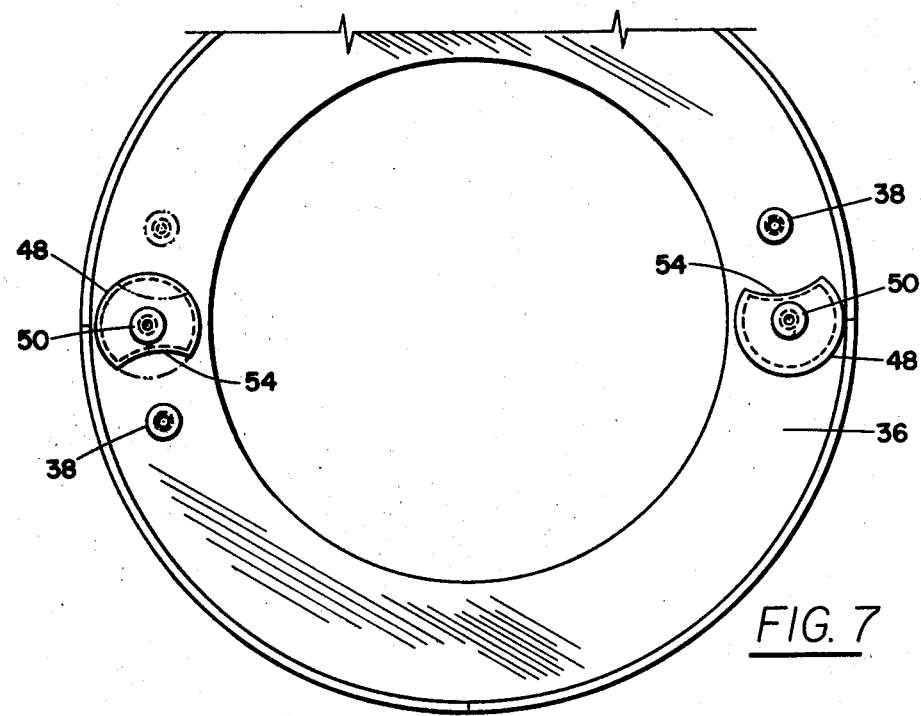
FIGURE 7 is a plan view of the slide ring of the ellipsograph showing the bosses and platforms for mounting of the pinions.

On its top surface the slide ring 36, has formed thereon two diametrically opposite circular bosses 38, as shown in FIGURE 7, and one of which is shown in FIGURE 5. Mounted on each of the bosses 38, and resting on the top face of slide ring 36, is a pinion gear couplet 40, comprising upper and lower pinion gears 42, and 44. Bosses 38 form vertical bearings about which the gear couplets 40, are freely rotatable, and cap screws 46, threaded into bosses 38, restrain vertical upward dislocation of the gear couplets 40. The lower pinion gear 44, of each gear couplet 40, is of larger diameter than the upper pinion gear 42, the ratio in the present instance being 2:1. Pinion gears 44, are arranged to mesh with the external ring gear 34, of the ellipsograph base 26, the ratio being 1:4.

Also on its top surface, the slide ring 36 has formed thereon two diametrically opposite platforms 48, in adjacent circumferential spaced relation with respect to the bosses 38, as best shown in FIGURE 7, and each of which platforms is provided with an upstanding boss 50. Mounted on each of the bosses 50, referring particularly to FIGURES 4 and 8, and resting on the top face of the platforms 48, is a pinion gear 52. Bosses 50, form vertical bearings about which the pinion gears 52, are freely rotatable. The height of the platforms 48, are such that the gears 52, overlap lower gears 44, of the gear couplets 40, and mesh with the upper gears 42, thereof, as may best be seen by referring to FIGURES 1 and 8, the ratio of gears 52, and 42, being 2:1. The portions of the platforms 48, adjacent the bosses 38, are each provided with an arcuate recess 54, to receive the peripheral portions of the gears 44, which, as previously described, are mounted on the bosses 38. Cap screws 56, threaded into bosses 50, restrain vertical upward displacement of gears 52.

It will be observed in view of the above, that when slide ring 36, is rotated with respect to the annular ellipsograph base 26, meshing of pinion gears 44, of pinion gear couplets 40, with external ring gear 34, of the ellipsograph base 26, causes the pinion gear couplets 40 to rotate about their own axes and at the same time are carried planetarily by the slide ring 36, around the ellipsograph base 26, and also around the protractor base ring 10, where the latter is employed. It will be further observed that meshing of reduction pinion gears, 42, of pinion gear couplets 40, with pinion gears 52, will effect rotation of the pinion gears 52 through two degrees about their own axes for each one degree of rotation of the slide ring 36. Thus, pinion gears 52, make two complete revolutions for each revolution of the slide ring 36. The significance of this will become apparent later in this description.

Figure 8:
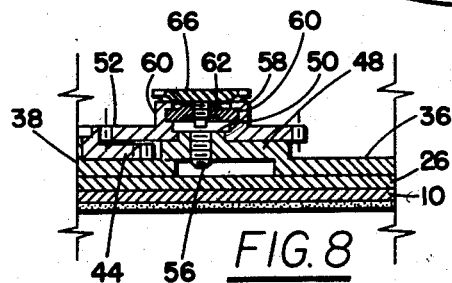
FIGURE 8 is a sectional view taken on the line E—E of FIGURE 1.

On the top surface of each of the pinion gears 52, and extending diametrically thereacross is a slide channel 58, hereinafter referred to as the segment channel 58. As best shown in FIGURES 1 and 8, the segment channels include a pair of parallel inverted L-shaped ribs 60, integrally formed on the top surface of the pinion gears 52, equidistantly spaced at opposite sides of the vertical axes of the pinion gears 52. While the segment channels 58, as shown, are formed as an integral part of the pinion gears 52, it is apparent that they may be formed as separate units suitably secured to the top surface of the pinion gears 52. Slidably mounted in the segment channels 58, are slide plates 62, hereinafter referred to as segment slide plates 62. The pinion gears 52, are disposed on the slide ring 36, so that when the axes of pinion gears 52 coincide with two opposite reference indicia 28, of the ellipsograph base 26, as shown in FIGURE 1, the axes of the segment channels 58, are in alinement with each other.

At least one of the inverted L-shaped ribs 60, of each of the segment channels 58, is provided with a scale 64, hereinafter referred to as the segment scale 64, for slidably setting the segment slide plates 62, in desired position, as later described. The segment slide plates are adapted to be locked in adjusted position by adjusting screws 66.

Figure 12:
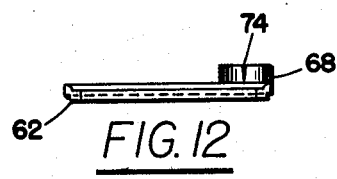
FIGURE 12 is a view in elevation of one of the segment slide plates.

Formed on the top surface of each of the segment slide plates 62, adjacent one end thereof is an upstanding boss 68, in which is threaded a vertical pivot pin 70. An arm 72, is pivotally connected at its opposite ends on the pivot pins 70, as best shown in FIGURE 4. The distance between the pivotal connections of arm 72, and pins 70, is arranged to be equal exactly to the distance between the axes of rotation of the pinion gears 52. Now, when slide ring 36, is rotated, thereby causing pinion gears 52, to revolve about center 0 while at the same time rotating about their own axes, it is apparent that any point on arm 72, will generate an ellipse. If the segment slide plates 62, are adjusted so that the axes of the pivotal connections of arm 72, and pins 70, coincide with the axes of rotation of the pinion gears 52, an ellipse of zero eccentricity is generated, in other words, a circle will be generated. If the segment slide plates 62, are adjusted so that the axes of the pivotal connections of arm 72, and pins 70, are eccentric with respect to the axes of rotation of the pinion gears 52, then an ellipse of any desired focal relation between a circle and a straight line may be generated, as hereinafter described in more detail. In order to accurately adjust the segment slide plates 62, in the segment channels 58, to obtain an ellipse of desired focal relation, the boss 68, of each of the segment slide plates 72, is provided with a marker 74, as shown in FIGURE 12, which is adapted to be lined up with a desired division line of a respective segment scale 64, of a respective segment channel 58, whereby the eccentricity of the axes of the pivotal connections of arm 72, and pins 70, with respect to the axes of rotation of the pinion gears 52, may be visually determined.

Embracing the side and top of the arm 72, is a sleeve 76, extending substantially the length of the arm 72, the sleeve 76, in cross section being of inverted U-shape. At one end, the sleeve 76, is pivotally attached to the sides of the arm 72, by a pivot pin 78. Near the opposite end of the sleeve, a headed pin 79, extends loosely through the top wall of the sleeve 76, and is threaded into the arm 72, at the bottom of a recess 80, as best shown in FIGURE 4. The head of the pin 79, permits slight pivoted movement of the sleeve 76, about pivot pin 78, with respect to the arm 72, and a spring 82, surrounding pin 79, and seated in the recess 80, normally urges the sleeve 76, upwardly against the head of pin 79. Thus the sleeve 76, can be depressed against the force of spring 82, by slight application of manual pressure, and is raised by the force of spring 82, when such manual pressure is relieved. The purpose of such movement of the sleeve 76 will become apparent later in the description. At the extreme end of the sleeve 76, opposite its pivotally mounted end there is fixed, in any suitable manner, an upstanding pin 84, carrying a rotatable knob 86. By grasping knob 86 and exerting slight downward pressure, the sleeve 76, can be depressed. At the same time, by exerting slight manual pressure in a horizontal circular direction, the slide ring 36, can be rotated with respect to the ellipsograph base 26.

Figures 10, 11:
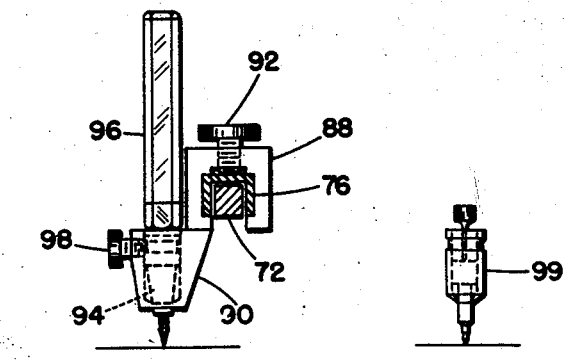
FIGURE 10 is a sectional view taken on line D—D of FIGURE 1.
FIGURE 11 is a view in elevation of a modified form of scribing element.

A scriber supporting bracket 88, is mounted on the sleeve 76, for slidable movement longitudinally therealong, as best shown in FIGURES 4 and 10, and extends in a lateral direction therefrom providing a depending laterally offset portion 90. The scriber supporting bracket 88, is provided with a locking screw 92, whereby the bracket 88, can be secured to the sleeve 76, in any longitudinally adjusted position therealong. Extending through a vertical recess 94, in the offset bracket portion 90, is a mechanical scribing member 96, which may be of the pencil type as shown in FIGURE 10, adapted to be locked in vertically adjusted position by a locking screw 98. A pen type scribing member 99, of conventional type as shown in FIGURE 11, or other suitable type of scribing member may be substituted for the pencil scribing member 96.

In order to facilitate generating dimensionally accurate predetermined ellipses from the particular scales employed it is important that the point of the scribing member 96, be in alinement with the axes of rotation of the pinion gears 52, and to accomplish this, the arm 72, which supports the sleeve 76, and its offset scribing member supporting bracket 88, is offset the necessary distance from the diameter extending through the axes of rotation of the pinion gears 52. It will be appreciated that the arm 72, could be disposed on the diameter extending through the axes of rotation of the pinion gears 52, but this would necessitate a less desirable arrangement for supporting the scribing member 96, in a manner such that the scribing point may be located in alinement with the axes of rotation of the pinion gears 52.

The trace or ellipse generated is controlled by the eccentricity of the pivotal connections of the arm 72, on the pinion gears 52, with respect to the axes of rotation of the pinion gears 52, and the position of the scribing member 96, longitudinally along the arm sleeve 76. As previously described the pivotal connections of the arm 72, on the pinion gears 52, is adjusted with respect to the axes of the pinion gears 52 by adjustment of the segment slide plates 62, in the segment channels 58, of the pinion gears 52.

Referring particularly to FIGURE 1, the sleeve 76, has two scales X' and Y' from zero to four inches. Depending on the size of the ellipsograph, the scales X' and Y' may be from zero to five or more inches. With the segment slide plates 62, disposed in the slide segment channels 58, so that the pivotal connections of the arm 72, are to the right of the axes of rotation of the pinion gears 52, as shown in FIGURE 1, positioning of scribing member 96, on the X' scale will result upon rotation of knob 86, about center 0 in an ellipse with its major axis on the X coordinate, as shown in full lines. With the positioning of scribing member 96 on the Y' scale, the result will be an ellipse with its major axis on the Y coordinate, as shown in broken lines.

It will be noted that the scales X' and Y' overlap, the extent to which they overlap being such that the distance between their zero division marks is equal exactly to the width of the scriber supporting bracket 88, so that the left side edge of the bracket 88, as viewed in FIGURE 1, can be employed in properly locating the point of the scribing member 96, with respect to the X' scale, and the right side edge of the bracket 88, can be employed in properly locating the point of the scribing member 96, with respect to the Y' scale. It is, of course, understood that the scales X' and Y' can be arranged to have their zero division markers in coincidence, in which case it would present a little more difficulty in lining up the point of the scribing member 96, with the desired division marker of the X' or Y' scales.

As previously brought out the gear ratio of gear train 34, 44, 42, and 52, is such that planetary gears 52, rotate twice about their own axes while making one revolution about the circumference of external ring gear 34. With a given setting of the pivotal connections of arm 72, with respect to the axes of rotation of the planetary gears 52, hereinafter referred to as the segment distance or segment, the difference between the major axis and the minor axis of the ellipse generated is predetermined, the difference being four times the segment distance. Thus, to obtain the proper focal relation of an ellipse having, for example, a major axis of six inches and a minor axis of four inches, subtract four inches from six inches and divide by four. The resultant answer is one-half inch, which is the required segment distance. The segment slide plates 62, are therefore adjusted with respect to the segment scales 64, to locate the pivotal connections of arm 72, a distance of one-half inch from the axes of rotation of planetary gears 52.

In order to obtain the desired dimensions of the major and minor axes of the ellipse, in the present case the above noted six inch by four inch ellipse, the one-half inch segment is subtracted from one-half the major axis or added to one-half the minor axis. The resultant is two and one-half inches which is denoted as the base circle. Now by setting the scriber bracket 88, at two and one-half inches on the X' scale as previously described, the desired six inch by four inch ellipse can be generated, with the major axis on the X coordinate, as shown in full lines in FIGURE 1, or by setting the scriber bracket 88, on the Y' scale in similar manner, the major axis will be on the Y coordinate, as shown in broken lines.

Formulawise the proper segment and base circle setting for any desired ellipse may therefore be expressed as follows:

$$\frac{\text{Major Axis} - \text{Minor Axis}}{4} = \text{Segment}$$

$$\frac{\text{Major Axis}}{2} - \text{Segment} = \text{Base Circle}$$

or $$\frac{\text{Minor Axis}}{2} + \text{Segment} = \text{Base Circle}$$

By rotating the ellipsograph proper 12, with respect to the protractor base 10, to any angle marker on scale 22, a desired ellipse may be generated on any one of a number of secondary pair of X—Y coordinates while still remaining oriented with respect to the origin of the primary X—Y coordinates.

With a known major axis and degree of ellipse, the segment dimension and base circle dimension may readily be determined.

Example: Required 30° ellipse with a six inch major axis.

$$\text{Sin of } 30° = .500$$

To determine the dimension of the half minor axis where the half major axis equals three inches.

$$\sin .500 = \frac{\text{side opposite}}{3 \text{ inches}}$$

therefore:

Side Opposite—1.5 inches (half minor axis)

Now knowing the half minor and half major axes, by the previously set forth formula the segment and base circle dimensions may be obtained. In other words, the segment will be—

$$\frac{\text{Major Axis (6 inches)} - \text{Minor Axis (3 inches)}}{4}$$

$$= .750 \text{ inch}$$

and the base circle will be—

$$\frac{\text{Major Axis (6 inches)}}{2} - \text{Segment (.750 inch.)}$$

$$= 2.250 \text{ inches}$$

Using the same illustration a constant can be derived for application to any ellipse of 30° determination and a varying half major axis. By dividing the segment .750 inch into the half major axis of three inches, a resulting constant of four is obtained. Thus for any 30° ellipse with a known major axis, the segment is obtained by dividing the half major axis by the constant four. Knowing the segment, the base circle may be obtained from the above formula, half major axis—segment=base circle.

In similar manner a constant can be derived for all ellipses from 0 to 90°.

In operation, the operator selects the position for the ellipse in relation to X and Y coordinates on the paper or other working surface. The ellipsograph proper 12, is then placed on the paper with the reference indicia 28, of the annular ellipsograph base 26, in coincidence with the primary X and Y coordinates. Optionally, the protractor base ring 10, may be placed on the paper with reference indicia 18 and 20, in coincidence with the primary X and Y coordinates, and the ellipsograph base 26, can then be disposed with its reference indicia 28, in coincidence with a desired degree division mark of the scale 22, of the protractor base ring 10, to thereby generate an ellipse on a selected secondary pair of X and Y coordinates. As previously described, locking screws 30, lock the ellipsograph base 26, in adjusted position on the protractor base ring 10.

Knowing the major and minor axes or the major and ellipse degree, the operator may now, in the manner set forth above, determine the proper segment dimension and base circle dimension for the generation of the desired ellipse. The segment dimension is set on the segment scale 64, and the arm 72, is locked by means of adjusting screws 60, in the manner previously described. The scriber mounting bracket 88, is set on the base circle dimension on the X' or Y' scale and locked on the sleeve 76, by locking screw 92, all as previously described.

The operator now places his hand on knob 86, depresses sleeve 76, against the force of spring 82, to allow the scribing member 96, to touch the paper. He then pulls the knob 86, rotationally about the circumference of the ellipsograph base 26, keeping a downward pressure on the knob 86, whereby the desired ellipse is traced on the paper. When the trace is completed with one continuous motion of 360°, release of the knob will cause the scribing element 96, to elevate from the paper as a result of the action of spring 82. It is understood, of course, that any desired portion of an ellipse may be traced by the extent through which the knob 86, is turned.

Figure 2:
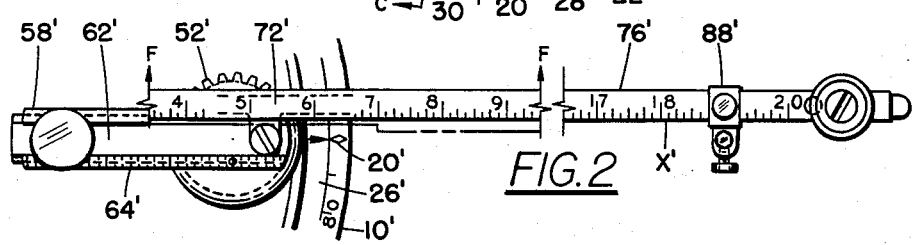
FIGURE 2 is a fragmentary plan view of the ellipsograph shown in FIGURE 1, illustrating a slightly modified form of scribing arm and segment channel.
Figure 3:
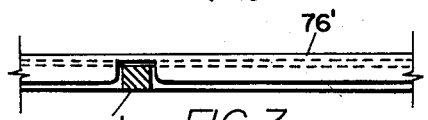
FIGURE 3 is a sectional view taken on line F—F of FIGURE 2.

In FIGURES 2 and 3, is shown a modification of the invention in which the arm 72', corresponding to arm 72 of the previously described form of the invention, is extended beyond the pivotal connection of arm 72' with the segment slide plate 62', it being understood that the arm 72' is similarly extended at its end diametrically opposite that shown in FIGURES 2 and 3. The sleeve 76', corresponding to sleeve 76, previously described, is similarly extended and the X' scale, as well as the Y scale, the latter not being shown, are similarly extended along the length of the sleeve 76'. The scriber mounting bracket 88', in all respects the same as scriber mounting bracket 88, is disposed on the extension of arm 72' outside the circumference of the ellipsograph base 26' or the protractor base ring 10, whereby large ellipses may be generated about the outside of the ellipsograph base. As noted in connection with the first form of the invention, the scriber mounting bracket 88' and scribing member supported thereby, may be disposed on either the X' or Y' scale. In the modified form of the invention, the segment slide channels 58' on the planetary pinion gear 52' are also extended, as are the scales 64', to allow a greater scope of elliptical development in keeping with the extension of the arm length.

While the gear train disclosed in the drawings shows gears having intermeshing teeth, it will be understood that such gears may be of the well known frictional type.

Although I have disclosed an exemplary embodiment of my invention herein for purposes of illustration, it should be understood that various changes may be made in the size and proportion of the several parts and in the details of construction thereof without departing from the spirit of the invention as defined by the claims which follow.

I claim:

1. In an ellipsograph, an annular member having an external driving ring, a pair of discs disposed at diametrically opposite sides of said driving ring, support means for said discs associated with said annular member for restricting bodily displacement of said discs with respect to said annular member to an orbital path about the circumference of said driving ring, means rotatably mounting said discs on said support, a driving connection between said driving ring and said discs for rotating said discs as they are moved in said orbital path, an arm pivotally connected with each of said discs, and a scribing element attached to said arm.

2. An ellipsograph as set forth in claim 1 wherein said driving connection includes reduction means.

3. An ellipsograph as set forth in claim 1 wherein the linear distance between the pivotal connections of said arm with said discs is equal to the linear distance between the axes of rotation of said discs.

4. An ellipsograph as set forth in claim 1 wherein said arm is laterally offset from the vertical plane passing through the pivotal connections of said arm with said discs, and the tracing point of the scribing element carried by said arms is in said vertical plane.

5. An ellipsograph as set forth in claim 1 including means for adjusting the eccentricity of the pivotal connections of said arm with respect to the axes of rotation of said discs.

6. An ellipsograph as set forth in claim 1 wherein said arm is provided with reciprocal scales reading outwardly from a midpoint on said arm, and wherein said scribing element is adjustable on said arm with respect to said scales for predetermining the length of the major axis of the constructed ellipse and its location selectively on an X or Y coordinate.

7. In an ellipsograph, an annular member having an external driving ring, a pair of discs disposed at diametrically opposite sides of said driving ring, support means for said discs associated with said annular member for restricting bodily displacement of said discs with respect to said annular member to an orbital path about the circumference of said driving ring, means rotatably mounting said discs on said support, a driving connection between said driving ring and said discs for rotating said discs as they are moved in said orbital path, an arm having a pivotal connection with each of said discs, means for adjusting the eccentricity of said pivotal connections with respect to the axes of rotation of said discs, a scribing element adjustably mounted on said arm, a scale on said discs and a scale on said arm for orienting said pivotal connections and said scribing element to respectively predetermine the eccentricity and the major axis of an ellipse to be constructed.

8. In an ellipsograph, an external ring gear, a pair of pinion gears disposed at diametrically opposite outer sides of said external ring gear, support means for said pinion gears associated with said external ring gear for restricting bodily displacement of said pinion gears with respect to said external ring gear to an orbital path about the circumference of said external ring gear, means rotatably mounting said pinion gears on said support, a driving connection between said ring gear and said pinion gears for rotating said pinion gears as they are moved in said orbital path, an arm pivotally connected with each of said pinion gears, and a scribing element attached to said arm.

9. In an ellipsograph, an annular base plate provided with an external ring gear, an annular slide plate concentric with said base plate and supported thereon for slidable rotation with respect thereto, a pair of diametrically opposite pinion gears rotatably mounted on said annular slide plate, an arm pivotally connected with each of said pinion gears, a driving connection between said ring gear and said pinion gears for imparting planetary motion to said pinion gears, and a scribing element attached to said arm.

10. In an ellipsograph, an annular base plate provided with an external ring gear, an annular slide plate concentric with said annular base plate and supported thereon for slidable rotation with respect thereto, a pair of diametrically opposite pinion gears rotatably mounted on said annular slide plate, an arm having a pivotal connection with each of said pinion gears, means for adjusting the eccentricity of said pivotal connections with respect to the axes of said pinion gears, a driving connection between said ring gear and said pinion gears for imparting planetary motion to said pinion gears, and a scribing element attached to said arm.

11. In an ellipsograph, an annular base plate provided with an external ring gear, an annular slide plate concentric with said base plate and supported thereon for slidable rotation with respect thereto, a pair of diametrically opposite pinion gears rotatably mounted on said annular slide plate, an arm pivotally connected with each of said pinion gears, a driving connection between said ring gear and said pinion gears for imparting planetary motion to said pinion gears, a scribing element carried by said arm, an annular support plate for rotatably supporting said annular base plate, a degree scale carried by said support plate and reference marking means carried by said annular base plate for cooperation with said degree scale for orienting said annular base plate with respect to said annular support plate.

12. In an ellipsograph, an annular base plate provided with an external driving wheel, an annular slide plate concentric with said base plate and supported thereon for slidable rotation with respect thereto, a pair of diametrically opposite driven wheels rotatably mounted on said annular slide plate, an arm pivotally connected with each of said driven wheels, a driving connection between said driving wheel and said driven wheels for rotating said driven wheels twice about their own axes while rotating once about said driving wheel, and a scribing element supported by said arm.

References Cited in the file of this patent

UNITED STATES PATENTS

| | | |
|---|---|---|
| 852,430 | Goodman | May 7, 1907 |
| 1,183,144 | Wagner | May 16, 1916 |